(12) United States Patent
Li

(10) Patent No.: US 11,038,777 B2
(45) Date of Patent: Jun. 15, 2021

(54) METHOD AND APPARATUS FOR DEPLOYING SERVICE IN VIRTUALIZED NETWORK

(71) Applicant: Huawei Technologies Co., Ltd., Shenzhen (CN)

(72) Inventor: Shitao Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 15/630,399

(22) Filed: Jun. 22, 2017

(65) Prior Publication Data

US 2017/0288983 A1  Oct. 5, 2017

Related U.S. Application Data

(63) Continuation of application No. PCT/CN2015/096359, filed on Dec. 3, 2015.

(30) Foreign Application Priority Data

Dec. 23, 2014 (CN) .......................... 201410814803.0

(51) Int. Cl.
  *G06F 11/07* (2006.01)
  *G06F 11/20* (2006.01)
  *H04L 12/24* (2006.01)
  *H04L 12/933* (2013.01)
  *H04L 12/931* (2013.01)
  (Continued)

(52) U.S. Cl.
  CPC .......... *H04L 41/5041* (2013.01); *H04L 12/46* (2013.01); *H04L 29/06* (2013.01); *H04L 41/12* (2013.01); *H04L 49/15* (2013.01); *H04L 49/70* (2013.01)

(58) Field of Classification Search
  CPC ...... H04L 47/70; H04L 67/10; H04L 41/5009
  USPC ........................................................ 709/226
  See application file for complete search history.

(56) References Cited

U.S. PATENT DOCUMENTS 7,492,762 B2 *  2/2009  Chowdhury .......... H04L 47/724
                                                    370/389
8,010,676 B1 *  8/2011  Battersby ................ H04L 47/82
                                                    709/226
(Continued)

FOREIGN PATENT DOCUMENTS

CN       103491129 A       1/2014
CN       103780467 A       5/2014
(Continued)

*Primary Examiner* — David R Lazaro
*Assistant Examiner* — Berhanu Shitayewoldetadik
(74) *Attorney, Agent, or Firm* — Slater Matsil, LLP

(57) ABSTRACT

Embodiments provide a method for service deployment in a virtualized network and a server. The method includes: receiving, by a server, a service deployment request, where the service deployment request includes description of a to-be-deployed service, for example, node information, connection information, and information about access to a deployed service; creating, by the server, an instance of the service, including: creating node instances, and establishing a connection between node instances; and finally establishing, by the server, a connection between the to-be-deployed service and the deployed service according to the information about access to the deployed service.

15 Claims, 5 Drawing Sheets

(51) Int. Cl.
*H04L 29/06* (2006.01)
*H04L 12/46* (2006.01)

(56) References Cited

U.S. PATENT DOCUMENTS

| | | | | |
|---|---|---|---|---|
| 8,745,236 B2* | 6/2014 | Battersby | ................ | H04L 67/10 709/226 |
| 8,869,207 B1* | 10/2014 | Earle | ................ | H04N 21/25808 725/48 |
| 9,325,585 B1* | 4/2016 | Wang | ................ | H04L 47/2491 |
| 9,396,287 B1* | 7/2016 | Bhave | ................ | G06F 16/3331 |
| 9,602,405 B1* | 3/2017 | Sharma | ................ | H04L 67/145 |
| 9,892,007 B2* | 2/2018 | Yang | ................ | G06F 11/3006 |
| 9,979,602 B1* | 5/2018 | Chinnakannan | ........ | H04L 47/82 |
| 2003/0028642 A1* | 2/2003 | Agarwal | ................ | H04L 67/20 709/226 |
| 2004/0078471 A1* | 4/2004 | Yang | ................ | H04L 63/0272 709/227 |
| 2004/0111506 A1* | 6/2004 | Kundu | ................ | H04L 67/42 709/223 |
| 2006/0002403 A1 | 1/2006 | Bettis et al. | | |
| 2006/0148555 A1* | 7/2006 | Dent | ................ | G06Q 50/34 463/25 |
| 2006/0269476 A1* | 11/2006 | Kuo | ................ | A61K 49/06 424/1.11 |
| 2007/0174429 A1 | 7/2007 | Mazzaferri et al. | | |
| 2009/0018996 A1* | 1/2009 | Hunt | ................ | G06F 16/2264 |
| 2009/0157870 A1* | 6/2009 | Nakadai | ................ | H04L 41/12 709/224 |
| 2009/0240924 A1 | 9/2009 | Yasaki et al. | | |
| 2010/0125477 A1* | 5/2010 | Mousseau | ............ | G06F 9/5077 717/177 |
| 2010/0169490 A1* | 7/2010 | McNair | ................ | G06F 9/5083 709/226 |
| 2011/0162062 A1 | 6/2011 | Kumar et al. | | |
| 2012/0016974 A1* | 1/2012 | Bartholomay | ...... | H04L 41/5041 709/221 |
| 2012/0102032 A1* | 4/2012 | Byrne | ................ | G06F 16/212 707/737 |
| 2012/0196261 A1* | 8/2012 | Kim | ........ | G09B 7/02 434/322 |
| 2012/0216233 A1* | 8/2012 | Yoon | ................ | H04L 41/12 725/109 |
| 2012/0227085 A1* | 9/2012 | Battersby | .............. | H04L 67/306 726/3 |
| 2012/0303816 A1* | 11/2012 | Kannan | ................ | G06F 9/50 709/226 |
| 2013/0290525 A1* | 10/2013 | Fedor | ................ | H04L 41/147 709/224 |
| 2013/0326558 A1* | 12/2013 | Kuo | ................ | H04N 21/237 725/46 |
| 2014/0007154 A1* | 1/2014 | Seibold | ................ | H04H 60/46 725/25 |
| 2014/0067275 A1* | 3/2014 | Jing | ................ | G06K 9/6222 702/19 |
| 2014/0122695 A1* | 5/2014 | Kulikov | ................ | H04L 43/00 709/224 |
| 2014/0137188 A1* | 5/2014 | Bartholomay | ......... | H04L 65/40 726/3 |
| 2014/0173594 A1* | 6/2014 | Ng | ................ | H04N 21/4516 718/1 |
| 2014/0189808 A1* | 7/2014 | Mahaffey | ............. | H04L 63/083 726/4 |
| 2014/0196022 A1 | 7/2014 | Skutin et al. | | |
| 2014/0229945 A1 | 8/2014 | Barkai et al. | | |
| 2015/0007233 A1* | 1/2015 | Earle | ................ | H04N 21/4622 725/44 |
| 2015/0056981 A1* | 2/2015 | Song | ................ | H04W 16/24 455/423 |
| 2015/0188777 A1* | 7/2015 | Frost | ................ | H04L 41/18 709/223 |
| 2015/0271276 A1* | 9/2015 | Edlund | ................ | G06F 9/5055 709/224 |
| 2015/0296247 A1* | 10/2015 | Glasser | ............. | H04N 21/6587 725/74 |
| 2016/0124777 A1* | 5/2016 | Boss | ................ | H04L 47/745 718/1 |
| 2016/0183168 A1* | 6/2016 | Horn | ................ | H04W 48/16 709/225 |
| 2016/0226913 A1* | 8/2016 | Sood | ................ | H04Q 9/00 |
| 2016/0294920 A1* | 10/2016 | Besprosvan | ........ | H04L 65/1073 |
| 2016/0380866 A1* | 12/2016 | Taylor | ................ | H04L 41/5061 709/224 |
| 2017/0085941 A1* | 3/2017 | Gupta | ................ | H04N 21/4316 |

FOREIGN PATENT DOCUMENTS

| | | |
|---|---|---|
| CN | 104009871 A | 8/2014 |
| CN | 104158675 A | 11/2014 |
| CN | 104219127 A | 12/2014 |
| EP | 2813945 A1 | 12/2014 |
| JP | 2008505405 A | 2/2008 |
| JP | 2009230549 A | 10/2009 |
| WO | 2006004995 A2 | 1/2006 |
| WO | 2014169870 A1 | 10/2014 |

* cited by examiner

Instance A1 of a service A

Instance A2 of the service A

Instance 1 of a service B

Instance 2 of the service B

METHOD AND APPARATUS FOR DEPLOYING SERVICE IN VIRTUALIZED NETWORK

CROSS-REFERENCE TO RELATED APPLICATIONS

This application is a continuation of International Application No. PCT/CN2015/096359, filed on Dec. 3, 2015, which claims priority to Chinese Patent Application No. 201410814803.0, filed on Dec. 23, 2014. The disclosures of the aforementioned applications are hereby incorporated by reference in their entireties.

TECHNICAL FIELD

The present invention relates to the field of information technologies, and in particular, to a method and an apparatus for deploying a service in a virtualized network.

BACKGROUND

In Network Functions Virtualization (NFV), functions of some dedicated network devices in a conventional network are implemented by using a common hardware device and virtualization technologies, so that a network service and a network function are no longer dependent on a dedicated hardware device, resources can be fully and flexibly shared, and a new service is quickly developed and deployed.

In the prior art, when deploying a service, a service provider needs to submit description information of the service to a network provider. The description information includes description of a service node and description of a connection between nodes. In the prior art, for example, in a TOSCA specification, when a service is deployed, node instances are first created, and then a connection is established between the node instances, so as to deploy the service.

However, when a newly deployed service needs to connect to a deployed service, there is no solution to describe and implement such a service requirement at present.

SUMMARY

To overcome a disadvantage in the prior art, embodiments of the present invention provide a method for service deployment in a virtualized network and a virtualized network server. The technical solutions are as follows.

According to a first aspect, an embodiment of the present invention provides a method for service deployment in a virtualized network. The method includes receiving a service deployment request, where the service deployment request includes first service description of a to-be-deployed first service, the first service description includes first node information, first connection information, and information about access to a deployed second service, and the information about access to the deployed second service includes input information used for determining a second service identifier and a second instance identifier, and access point information of the second service. The method also includes creating a first instance of the first service, including: creating node instances according to the first node information, and establishing a connection between node instances of the first service according to the first connection information. The method also includes determining the second service identifier and the second instance identifier according to the input information, and further establishing a connection between the first instance of the first service and a second instance of the second service according to the second service identifier, the second instance identifier, and the access point information of the second service.

In a first possible implementation manner of the first aspect, the input information includes a query condition; the determining the second service identifier and the second instance identifier according to the input information specifically includes: obtaining, by a virtualized network server by means of querying according to the query condition, the second service identifier and the second instance identifier that are of the deployed second service and that satisfy the query condition; and if multiple instance identifiers that are of the second service and that satisfy the query condition are obtained by means of querying, the method further includes: returning, by the virtualized network server, the obtained multiple instance identifiers of the second service to a service provider device, and receiving a second instance identifier that is of the second service and that is selected by the service provider.

In a second possible implementation manner of the first aspect, the input information includes a query condition; the determining the second service identifier and the second instance identifier according to the input information specifically includes: obtaining, by a virtualized network server by means of querying according to the query condition, the second service identifier and the second instance identifier that are of the deployed second service and that satisfy the query condition; and if multiple instance identifiers that are of the second service and that satisfy the query condition are obtained by means of querying, the establishing a connection between the first instance of the first service and a second instance of the second service specifically includes: creating, by the virtualized network server, a corresponding first instance of the first service for each second instance identifier that is of the second service and that is obtained by means of querying, and establishing a connection between the created first instance of the first service and a corresponding second instance of the second service according to the second service identifier, each second instance identifier, and the access point information of the second service.

In a third possible implementation manner of the first aspect, the input information directly includes the second service identifier and the second instance identifier.

In a fourth possible implementation manner of the first aspect, the input information instructs to use an input device to receive the second service identifier and the second instance identifier that are input.

In a fifth possible implementation manner of the first aspect, the access point information of the second service includes one or more of the following: an access point identifier, a protocol type used during access, or a port number.

According to a second aspect, an embodiment of the present invention provides a virtualized network server. The server includes a communications module, configured to receive a service deployment request, where the service deployment request includes first service description of a to-be-deployed first service, the first service description includes first node information, first connection information, and information about access to a deployed second service, and the information about access to the deployed second service includes input information used for determining a second service identifier and a second instance identifier, and access point information of the second service. The server also includes an instance creation module, configured to create a first instance of the first service, including:

creating node instances according to the first node information, and establishing a connection between node instances of the first service according to the first connection information. The server also includes an access module, configured to: determine the second service identifier and the second instance identifier according to the input information, and further establish a connection between the first instance of the first service and a second instance of the second service according to the second service identifier, the second instance identifier, and the access point information of the second service.

In a first possible implementation manner of the second aspect, the input information includes a query condition; that the access module determines the second service identifier and the second instance identifier according to the input information specifically includes: the access module obtains, by means of querying according to the query condition, the second service identifier and the second instance identifier that are of the deployed second service and that satisfy the query condition; and if multiple instance identifiers that are of the second service and that satisfy the query condition are obtained by means of querying, the communications module returns the obtained multiple instance identifiers of the second service to a service provider device, and receives a second instance identifier that is of the second service and that is selected by the service provider.

In a second possible implementation manner of the second aspect, the input information includes a query condition; that the access module determines the second service identifier and the second instance identifier according to the input information specifically includes: the access module obtains, by means of querying according to the query condition, the second service identifier and the second instance identifier that are of the deployed second service and that satisfy the query condition; and if multiple instance identifiers that are of the second service and that satisfy the query condition are obtained by means of querying, the instance creation module creates a corresponding first instance of the first service for each second instance identifier that is of the second service and that is obtained by means of querying, and the access module establishes a connection between the created first instance of the first service and a corresponding second instance of the second service according to the second service identifier, each second instance identifier, and the access point information of the second service.

In a third possible implementation manner of the second aspect, the input information directly includes the second service identifier and the second instance identifier.

In a fourth possible implementation manner of the second aspect, the input information instructs to use an input device to receive the second service identifier and the second instance identifier that are input.

In a fifth possible implementation manner of the second aspect, the access point information of the second service includes one or more of the following: an access point identifier, a protocol type used during access, or a port number.

According to the foregoing technical solutions provided in the embodiments of the present invention, a connection to another service during service deployment is implemented, and flexibility of deploying a virtualized service is improved. Flexibility of deploying a virtual service is further improved by using different input query conditions and different processing manners.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes technical solutions in embodiments of the present invention with reference to accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
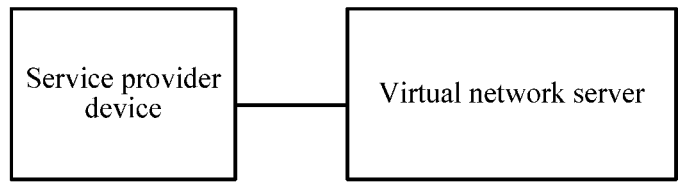
FIG. 1 is a system architecture diagram of a virtualized network according to an embodiment of the present invention.

An embodiment of the present invention provides a system for service deployment in a virtualized network. As shown in FIG. 1, the system includes a service provider device and a virtualized network server.

The service provider (SP) device is configured to: generate a service deployment request, and send the request to the virtualized network (VN) server. After the VN server performs deployment, the SP device may receive a response returned by the VN server. The SP device may be a computer, a mobile terminal, a tablet computer, or the like. The virtualized network server is configured to: receive the service deployment request sent by the SP device, and deploy a service. A deployed service instance includes node instances of the service, a connection between node instances, and a connection to another service instance. For a specific deployment method, refer to the following embodiment.

Figure 2:
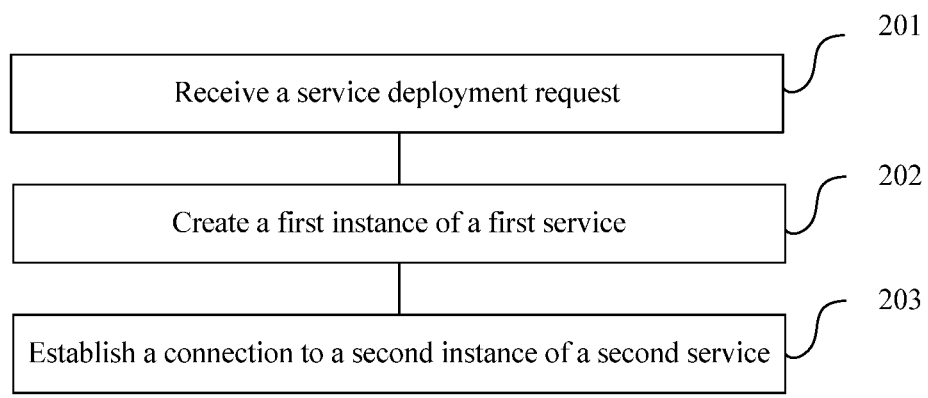
FIG. 2 is a flowchart of a method for service deployment in a virtualized network according to an embodiment of the present invention.

An embodiment of the present invention further provides a method for service deployment in a virtualized network, and the method is applied to the system shown in FIG. 1. The method is shown in FIG. 2, and includes the following steps.

201. Receive a service deployment request, where the service deployment request includes first service description of a to-be-deployed first service.

An SP device sends the service deployment request that includes the first service description to a VN server. The first service description includes first node information, first connection information, and information about access to a deployed second service. The information about access to the deployed second service includes input information used for determining a second service identifier and a second instance identifier, and access point information of the second service.

202. Create a first instance of the first service.

A process in which the VN server creates an instance includes: creating node instances according to the first node information, and establishing a connection between node instances of the first service according to the first connection information.

203. Determine a second service identifier and a second instance identifier according to the input information, and further establish a connection between the first instance of the first service and a second instance of a second service according to the second service identifier, the second instance identifier, and access point information of the second service.

After creating the first instance of the first service, the VN server determines the second service identifier and the second instance identifier according to the input information included in the first service description, and further establishes the connection between the first instance of the first service and the second instance of the second service according to the second service identifier, the second instance identifier, and the access point information of the second service.

In this embodiment of the present invention, a connection to another service during service deployment is implemented, and flexibility of deploying a virtualized service is improved.

Figure 3:
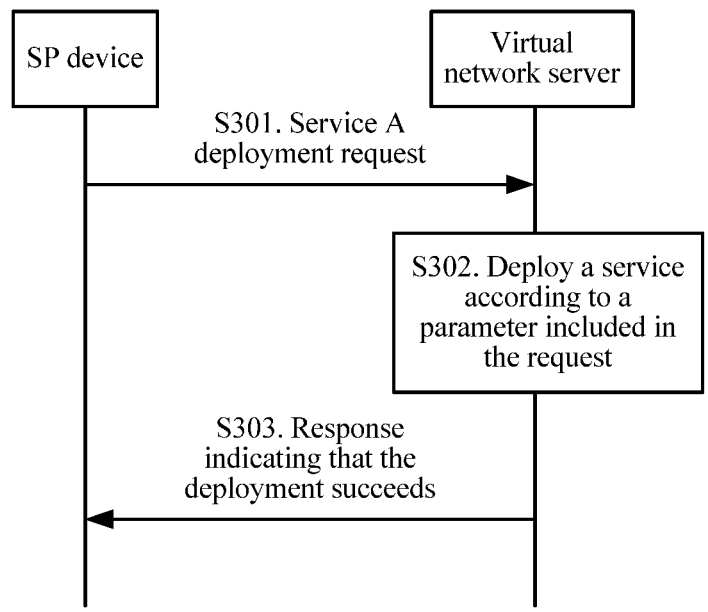
FIG. 3 is a flowchart of another method for service deployment in a virtualized network according to an embodiment of the present invention.

In another embodiment of the present invention, a service provider SP wants to deploy a service A. The service A includes three nodes: an OCS (Online Charging System) node, a GGSN (Gateway GPRS Support Node) node, and a PCRF (Policy and Charging Rules Function) node. A deployment process of the service A is shown in FIG. 3. An SP device sends a service deployment request to a VN server. After deploying the service, the VN server returns a response indicating that the deployment succeeds. The deployment process specifically includes the following steps.

S301. An SP device sends a service deployment request to a VN server, where the request includes service description information.

The service description information may include node information and information about a connection between nodes, and may further include access point information. One service generally includes multiple service function nodes. Different service function nodes implement different functions. The connection between the nodes is used for data interaction between the service function nodes. Access point information of a service is used by another service to access the service.

The node information may include a node type, a node property, a connection relationship with another node, and the like. For example, in this embodiment, description information of a PCRF node includes:

```
PCRF:
    type: tosca.nodes.compute.pcrf
    properties:
        ...#another parameter that may be used is omitted
        connectpoint:
            ip_protocol: tcp
            ip_version: v4
            ip_port: 2049
            ref_point: 3gpp:PCRF:Gx
    requirements:
        -connect: OCS
        -connect: GGSN
```

In the foregoing description information, "type" represents the node type, and "properties" represents the node property and may include multiple properties. A "connectpoint" property indicates that the node may be used as an access point of the service. When the PCRF node is used as an access point, a TCP protocol of a version v4 is used, a port number is 2049, and a name of the access point is "3gpp: PCRF:Gx". "requirements" is used to indicate a connection relationship between the node and another node. The foregoing example includes two connections, that is, a connection to an OCS node and a connection to a GGSN node.

Similarly, description information of the OCS node and description information of the GGSN node also include a node type, a node property, a connection relationship with another node, and the like. The OCS node is separately connected to the PCRF node and the GGSN node, and the description information of the OCS node is as follows:

```
OCS:
    type: tosca.nodes.compute.ocs
    properties:
    ...#another parameter that may be used is omitted
        requirements:
            -connect: PCRF
            -connect: GGSN
```

The description information of the GGSN node is as follows: The GGSN node is separately connected to the PCRF node and the OCS node, and the GGSN node may also be used as an access point of the service. When the GGSN node is used as an access point, a TCP protocol of a version v4 is used, a port number is 2048, and a name of the access point is "3gpp:GGSN:Gi".

```
GGSN:
    type: tosca.nodes.compute.ggsn
    properties:
        ...#another parameter that may be used is omitted
        connectpoint:
            ip_protocol: tcp
            ip_version: v4
            ip_port: 2048
            ref_point: 3gpp:GGSN:Gi
    requirements:
        -connect: OCS
        -connect: PCRF
```

In addition, the service description information may further include input/output information. For example, some input information may be obtained from an input device such as a keyboard of the VN server, or some information may be output to an output device such as a display of the VN server. In this embodiment, information such as a service provider name and a deployment location may be input during service deployment. Information such as a service name and an IP address may be output after the service is successfully deployed. Specific input/output description information is as follows:

```
inputs:
    operator:
        type: string
            description: the operator who provides the service.
    location:
        type: string
            description: the location where this service serves to.
outputs:
    server_ip:
        description: The IP address of the provisioned server.
        value: {get_attribute: [service_A, ip_address]}
```

In the foregoing input/output information, elements "operator" and "location" included in "inputs" respectively represent the service provider name and the deployment location during the deployment. When the service is deployed, the SP name and the deployment location may be input by using an input interface. When the service may be deployed in two different cities, corresponding city names such as "Beijing" and "Shanghai" are input.

An element "server_ip" included in "outputs" is information that may be output outwards when the service is successfully deployed. "server_ip" represents an IP address of a service instance, a value "value" of "server_ip" is obtained by using an operation get_attribute: [service_A, ip_address], and "service_A" is a service name of the service A.

S302. After receiving the service deployment request, the VN server analyzes node information, connection information, input/output information, and the like of a service in the request, and deploys the service according to the information, that is, creates an instance. For example, in this embodiment, when creating an instance, the VN server first creates node instances: an OCS node, a PCRF node, and a GGSN node, and then establishes a connection between the node instances according to an element connect in the description information. After the deployment is completed, the service instance has two access points: the PCRF and the GGSN.

S303. After creating the service instance, the VN server returns, to the SP device, a response indicating that the deployment succeeds. The response may include a service identifier, an identifier indicating that the creation succeeds, an identifier of the created instance, or the like.

Figure 4:
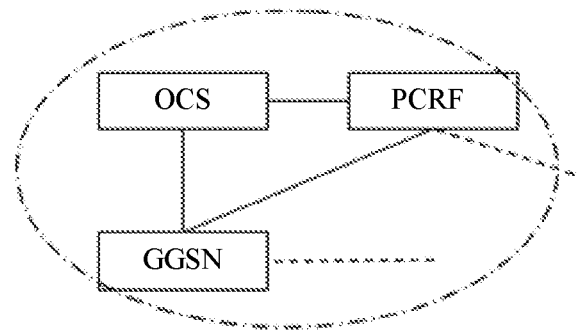
FIG. 4 is a schematic diagram of an instance after service deployment according to an embodiment of the present invention.
Figure 4:
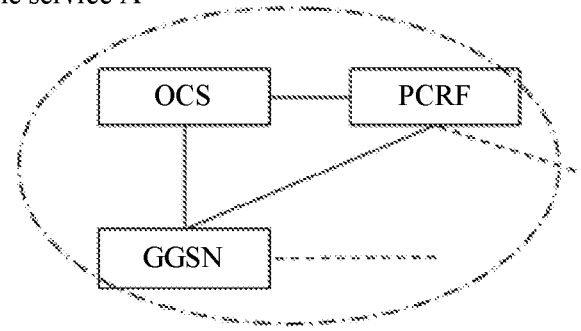

Multiple service instances may be created. For example, as shown in FIG. 4, after the service A is deployed, a system includes two service instances of the service A: an instance A1 and an instance A2.

In still another embodiment of the present invention, it is assumed that an SP wants to deploy a new service such as a service B, and another service such as a service A has been deployed in a system. After the service B is deployed, a service instance of the service B needs to be connected to a service instance of the deployed service A.

In this embodiment, it is assumed that the deployed service A includes three nodes: an OCS, a GGSN, and a PCRF. Two service instances A1 and A2 of the service A have been deployed. For a deployment process of the service A, refer to corresponding description in the embodiment shown in FIG. 3. The to-be-deployed service B includes three nodes: a deep packet inspection DPI (Deep Packet Inspection) node, an optimizer (Optimizer) node, and a firewall (Firewall) node.

Figure 5:
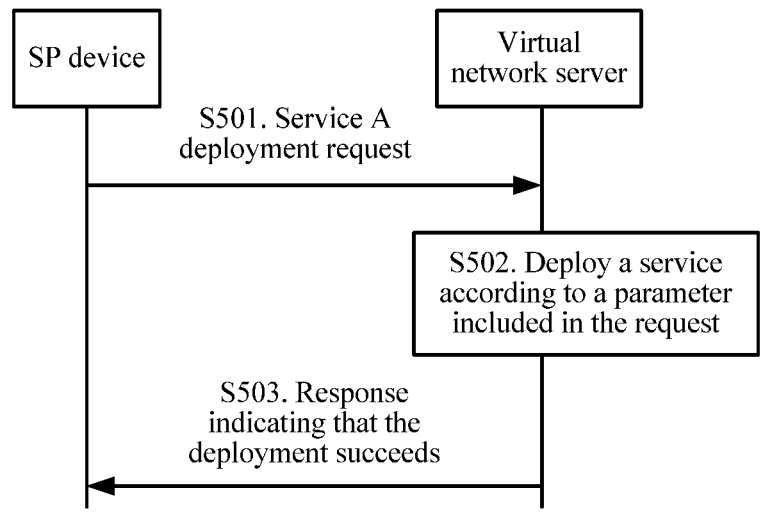
FIG. 5 is a flowchart of still another method for service deployment in a virtualized network according to an embodiment of the present invention.

A deployment process of the service B is shown in FIG. 5. An SP device sends a service deployment request to a VN server. After deploying the service, the VN server returns a response indicating that the deployment succeeds. The deployment process specifically includes the following steps.

S501. An SP device sends a service deployment request to a VN server, where the request includes service description information of a service B.

The service description information of the service B may include node information and information about a connection between nodes. One service generally includes multiple service function nodes. Different service function nodes implement different functions. The connection between the nodes is used for data interaction between the service function nodes. The description information of the service B further includes information about access to a deployed service A, and the information about access to the deployed service A may include input information used for determining a service identifier of the service A and an instance identifier, access point information of the service A, and the like.

If the to-be-deployed service B further needs to be connected to a deployed service, the deployed service may be used as a special node of the to-be-deployed service in the description information, and the special node may be referred to as a "dummy node" (dummy Node). A node of the to-be-deployed service may be connected to the dummy node, so that a connection between the to-be-deployed service and the deployed service is implemented. In this embodiment, a type of the dummy node may be first defined.

```
node_types:
    tosca.nodes.dummyNode:
        derived_from: tosca.nodes.Root
        properties:
            identification:
                service_ID: # a service identifier corresponding to a deployed service
                instance_ID: # an instance identifier corresponding to the deployed service
            constrains:
                location:
                operator:
```

Herein, dummyNode indicates that a node type is a dummy node, and the VN server does not need to actually deploy a service; and service_ID and instance_ID respectively represent a service identifier and an instance identifier of a deployed service. A value of service_ID and a value of instance_ID may be directly specified, or may be obtained by means of querying in a specific manner. If the value of service_ID and the value of instance_ID are obtained by means of querying, a query condition of the deployed service and instance may be indicated by using "constrains". For example, query may be performed by using a location "location" of the service instance or a service provider name "operator".

After the type of the dummy node is defined, a deployed service and a deployed instance to which the to-be-deployed service needs to be connected may be further specified in the description information. Usually, service identifier information, instance identifier information, or related query information may be input by using an input interface during service deployment. An example is as follows:

```
inputs:
    ref_serviceID:
        type: string
        description: the service template ID of the
        reference network service
    instance_ID:
        type: string
        description: the instance ID of the reference
        network service instance
    constrain_operator:
        type: string
        description: the name of the operator who provide
        the service
    constrain_location:
        type: string
        description: the name of the location where this
        service serves to.
node_templates:
    Ref_service_A:
        type: tosca.nodes.dummyNode
        properties:
            identification
                ref_ID: {get_input: ref_serviceID}
                instance_ID: {get_input: instanceID}
            constrain:
                location: {get_input: constrain_location}
                operator: {get_input: constrain_operator}
```

Herein, a type of a node Ref_service_A is dummyNode indicating that the node Ref_service_A is a dummy node, that is, a deployed service. A service identifier ref ID of the node Ref_service_A and an instance_ID of a deployed instance are determined by using input parameters ref_serviceID and instanceID. Similarly, a parameter of a query condition constrain of the node is obtained by using an input parameter.

A DPI node of the to-be-deployed service B includes the following node information:

```
DPI:
    type: tosca.nodes.compute.dpi
    requirements:
        -connect: Ref_service_A
            connectpoint: {get_connectpoint [Ref_service_A,
            3gpp:GGSN:Gi]}
            connectpoint: {get_connectpoint [Ref_service_A,
            3gpp:PCRF:Gx]}
        -connect: Optimizer
```

The foregoing node information indicates that the DPI node needs to establish a connection to the deployed service Ref_service_A, and needs to separately establish connections to two access points "3gpp:GGSN:Gi" and "3gpp:PCRF:Gx" of Ref_service_A. The DPI node further needs to establish a connection to an optimizer node of the service B.

The optimizer node of the to-be-deployed service B includes the following node information:

```
Optimizer
    type: tosca.node.compute.optimizer
    Requirements:
        -connect: Ref_service_A
            Connectionpoint: {get_connectpoint [Ref_service_A,
            3gpp:PCRF:Gx]}
        -connect: DPI
        -connect: Firewall
```

The foregoing node information indicates that, when the optimizer node needs to establish a connection to the deployed service Ref_service_A, the optimizer node needs to establish a connection to only the access point "3gpp:PCRF:Gx" of Ref_service_A. The optimizer node further needs to establish connections to the DPI node and a firewall node.

The firewall node of the to-be-deployed service B includes the following node information:

```
Firewall
    type: tosca.node.compute.firewall
    Requirements:
        -connect: Optimizer
```

The foregoing node information indicates that the firewall node needs to establish a connection to the optimizer node.

S502. After receiving the service deployment request, the VN server analyzes node information, connection information, input/output information, and the like of a service in the request, and deploys the service according to the information, where multiple instances may be created.

Figure 6:
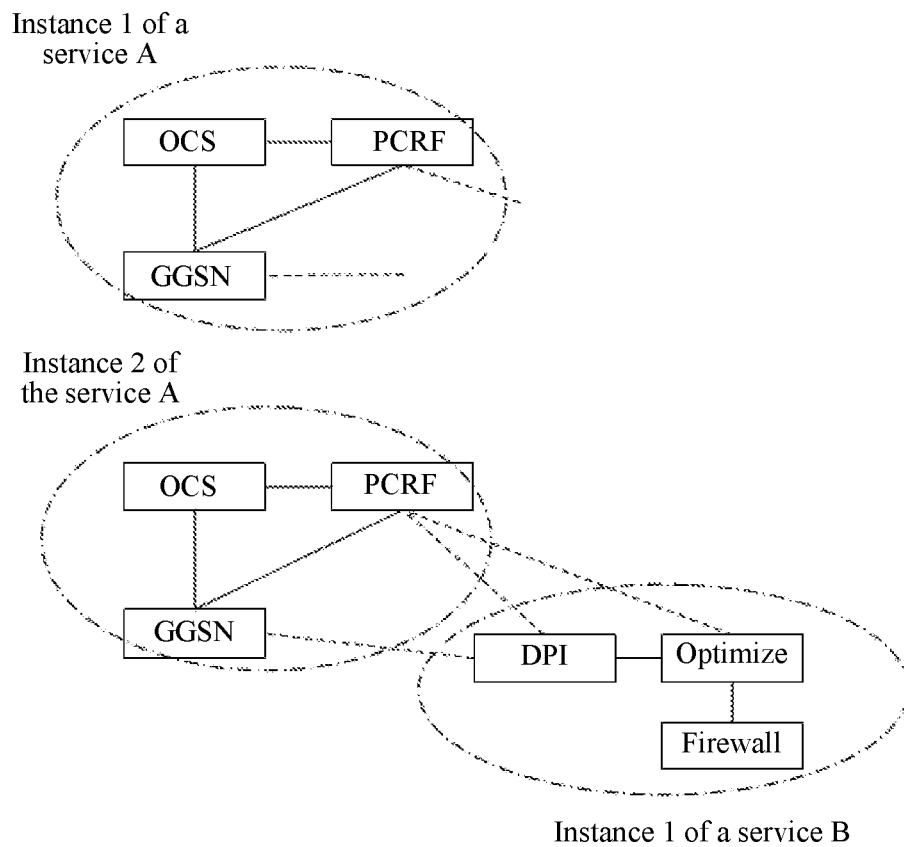
FIG. 6 is a schematic diagram of another instance after service deployment according to an embodiment of the present invention.

For example, if the service deployment request directly includes the service identifier and the instance identifier of the deployed service A, the VN server may first create an instance of the service B, where the creation includes creating node instances: a DPI node, an optimizer node, and a firewall node; and then establish a connection between the node instances according to an element connect in the description information. In this embodiment, the VN server separately establishes a connection between the optimizer node and the DPI node, and establishes a connection between the optimizer node and the firewall node. After creating the instance of the service B, the VN server directly establishes a connection between an instance 1 of the service B and an instance 2 of the service A according to the service identifier and the instance identifier that are of the service A and that are carried in the description information. In this embodiment, as shown in FIG. 6, the VN server establishes a connection between a DPI node of the instance 1 of the service B and an access point 3gpp:GGSN:Gi of the instance 2 of the service A, a connection between the DPI node of the instance 1 of the service B and an access point 3gpp:PCRF:Gx of the instance 2 of the service A, and a connection between the optimizer node and the access point 3gpp:PCRF:Gx of the instance 2 of the service A.

Alternatively, the service deployment request may not directly include the service identifier and the instance identifier of the deployed service, and obtains the service identifier and the instance identifier of the deployed service by using an input device.

The service deployment request may carry a query condition. For example, as shown in the foregoing description information, the service identifier may be queried by using the service provider name "operator", and the service instance identifier may be queried by using information such as a service instance location "location". The VN server obtains the service identifier and the instance identifier of the deployed service by means of querying according to the query condition. For example, the VN server obtains a service identifier of the service B and an instance identifier of the instance 2 by means of querying. As shown in FIG. 6, the VN server establishes the connection between the instance 1 of the service B and the instance 2 of the service A according to the service identifier and the instance identifier that are obtained by means of querying, and the access point information.

If the VN server obtains, by means of querying by using the query condition, multiple instance identifiers that satisfy the condition, the VN server may return the obtained multiple instance identifiers to the SP device. The SP device selects one of the instance identifiers. After receiving the instance identifier selected by the service provider, the VN server establishes a connection between the foregoing created instance and a selected created instance.

Figure 7:
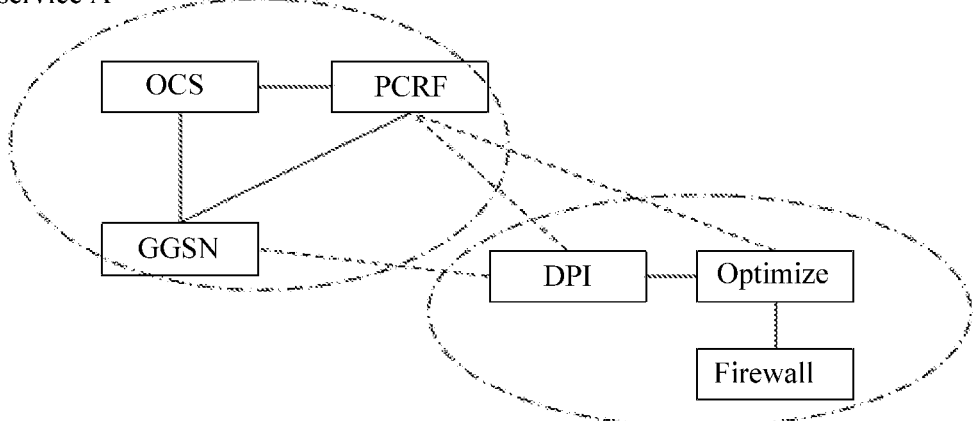
FIG. 7 is a schematic diagram of still another instance after service deployment according to an embodiment of the present invention.
Figure 7:
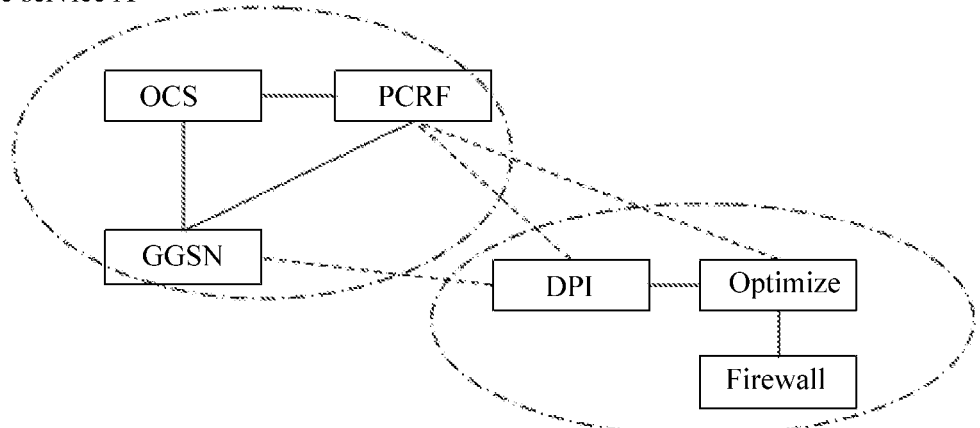

Alternatively, if the VN server obtains, by means of querying by using the query condition, multiple instance identifiers that satisfy the condition, the VN server may create a corresponding service instance for each instance identifier obtained by means of querying, and establish a connection between the created service instance and a corresponding deployed service instance according to the service identifier and an instance identifier of the deployed service, and the access point information. For example, as shown in FIG. 7, if two service instances that are of the deployed service A and that satisfy the query condition are obtained by means of querying, where the two services are an instance 1 and an instance 2 of the service A, the VN server may create two instances of the service B when deploying the service B, and the two instances are an instance 1 and an instance 2 of the service B. Then, the VN server separately establishes a connection between the instance 1 of the service A and the instance 1 of the service B and a connection between the instance 2 of the service A and the instance 2 of the service B according to the service identifier, the instance identifier, and the access point information.

A parameter may be carried in a service deployment request message, to notify the VN server of a manner used for processing when multiple deployed service instances that satisfy the condition are obtained by means of querying. For example, a parameter "match" may be carried in the request message, and a value of the parameter may be one of the following three values: "any/return/all". "any" indicates that the VN server selects any deployed service instance for access; "return" indicates that the VN server returns multiple instance identifiers obtained by means of querying, for selection by the SP; and "all" indicates that the VN server creates to-be-deployed service instances that are in a one-to-one correspondence with multiple instance identifiers obtained by means of querying.

S503. After creating the service instances, the VN server returns, to the SP device, a response indicating that the deployment succeeds. The response may include a service identifier, an identifier indicating that the creation succeeds, identifiers of the created instances, or the like.

In this embodiment of the present invention, a connection to another service during service deployment is implemented, and flexibility of deploying a virtualized service is improved. Further, a service identifier and an instance identifier of a deployed service are obtained in different manners. Therefore, flexibility of service deployment is further improved.

Figure 8:
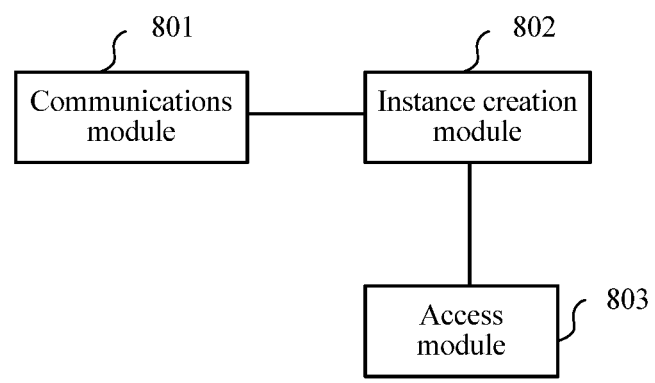
FIG. 8 is a schematic structural diagram of a virtualized network server according to an embodiment of the present invention.

An embodiment of the present invention further provides a virtualized network server, configured to implement the method embodiment shown in FIG. 2, FIG. 3, or FIG. 5. Specifically, as shown in FIG. 8, the virtualized network server provided in this embodiment of the present invention includes: a communications module 801, configured to receive a service deployment request, where the service deployment request includes first service description of a to-be-deployed first service, the first service description includes first node information, first connection information, and information about access to a deployed second service, and the information about access to the deployed second service includes input information used for determining a second service identifier and a second instance identifier, and access point information of the second service; an instance creation module 802, configured to create a first instance of the first service, including: creating node instances according to the first node information, and establishing a connection between node instances of the first service according to the first connection information; and an access module 803, configured to: determine the second service identifier and the second instance identifier according to the input information, and further establish a connection between the first instance of the first service and a second instance of the second service according to the second service identifier, the second instance identifier, and the access point information of the second service.

Optionally, the input information includes a query condition. That the access module determines the second service identifier and the second instance identifier according to the input information specifically includes: The access module obtains, by means of querying according to the query condition, the second service identifier and the second instance identifier that are of the deployed second service and that satisfy the query condition. If multiple instance identifiers that are of the second service and that satisfy the query condition are obtained by means of querying, the communications module returns the obtained multiple instance identifiers of the second service to a service provider device, and receives a second instance identifier that is of the second service and that is selected by the service provider.

Alternatively, the input information includes a query condition. That the access module determines the second service identifier and the second instance identifier according to the input information specifically includes: The access module obtains, by means of querying according to the query condition, the second service identifier and the second instance identifier that are of the deployed second service and that satisfy the query condition. If multiple instance identifiers that are of the second service and that satisfy the query condition are obtained by means of querying, the instance creation module creates a corresponding first instance of the first service for each second instance identifier that is of the second service and that is obtained by means of querying, and the access module establishes a connection between the created first instance of the first service and a corresponding second instance of the second service according to the second service identifier, each second instance identifier, and the access point information of the second service.

Optionally, the input information directly includes the second service identifier and the second instance identifier. Alternatively, the input information instructs to use an input device to receive the second service identifier and the second instance identifier that are input.

Optionally, the access point information of the second service includes one or more of the following: an access point identifier, a protocol type used during access, or a port number.

In the foregoing embodiment, a connection to another service during service deployment is implemented, and flexibility of deploying a virtualized service is improved. Further, a service identifier and an instance identifier of a deployed service are obtained in different manners. Therefore, flexibility of service deployment is further improved.

Figure 9:
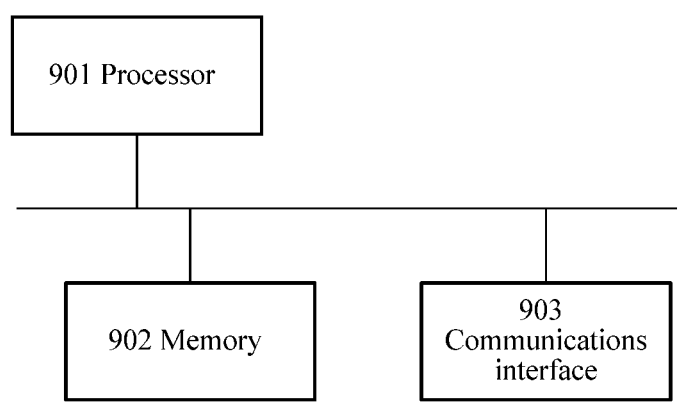
FIG. 9 is a schematic structural diagram of another virtualized network server according to an embodiment of the present invention.

FIG. 9 shows another schematic structural diagram of a virtualized network server according to an embodiment of the present invention. A general-purpose computer system structure is used. Program code for executing the solutions of the present invention is stored in a memory, and a processor controls the execution. The virtualized network server includes a processor 901, a memory 902, and a communications interface 903.

The processor may be a general-purpose central processing unit (CPU), a microprocessor, an application-specific integrated circuit (ASIC), or one or more integrated circuits used for controlling execution of programs of the solutions of the present invention.

One or more memories included in a computer system may be a non-volatile computer readable storage medium, such as a read-only memory (ROM) or a static storage device of another type that can store static information and an instruction, or may be a magnetic disk memory. These memories may be connected to the processor by using a bus. The memory stores the program code that executes the solutions of the present invention, for example, a program that executes the method in the embodiment shown in FIG. 2, FIG. 3, or FIG. 5. The program code that executes the solutions of the present invention is stored in the memory, and the processor controls the execution.

The communications interface may be an apparatus of a transceiver type, so as to communicate with another device or communications network, such as an Ethernet, a radio access network (RAN), or a wireless local area network (WLAN).

It should be noted that the embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for execution processes of specific functions of each unit, reference may be made to partial descriptions in the method embodiment. The described apparatus embodiment is merely an example. The units described as separate parts may or may not be physically separate, and parts displayed as units may or may not be physical units, may be located in one position, or may be distributed on multiple network units. Some or all modules may be selected according to actual needs to achieve the objectives of the solutions of the embodiments. A person of ordinary skill in the art may understand and implement the embodiments of the present invention without creative efforts.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
receiving, by a virtualized network (VN) server, a service deployment request from a service provider device, wherein the service deployment request comprises a first service description of a to-be-deployed first service, the first service description comprises first Network Functions Virtualization (NFV) node information, first connection information, and information about access to a deployed second service, and wherein the information about access to the deployed second service comprises input information and access point information of the second service for the first service to use to access the second service, and wherein the access point information of the second service comprises an access point identifier used during access of the second service, a protocol type used during access of the second service, and a port number used during access of the second service;
creating, by the VN server, multiple NFV node instances according to the first NFV node information, and establishing a connection used for data interaction between the multiple NFV node instances of the first service according to the first connection information;
determining, by the VN server, a second service identifier and a second NFV node instance identifier according to the input information; and
establishing, by the VN server, a connection used for data interaction between a first NFV node instance of the first service and a second NFV node instance of the second service according to the second service identifier, the second NFV node instance identifier, and the access point information of the second service, wherein the first NFV node instance and the second NFV node instance are node instances of the multiple NFV node instances.

2. The method according to claim 1, wherein the input information comprises a query condition;
wherein determining the second service identifier and the second NFV node instance identifier according to the input information comprises:
obtaining, by the VN server by querying according to the query condition, the second service identifier and the second NFV node instance identifier that are of the deployed second service and that satisfy the query condition; and
wherein, when multiple NFV node instance identifiers that are of the second service and that satisfy the query condition are obtained by querying, the method further comprises:
returning, by the VN server, the obtained multiple NFV node instance identifiers of the second service to the service provider device, and receiving the second NFV node instance identifier that is of the second service and that is selected by the service provider device.

3. The method according to claim 1, wherein the input information comprises a query condition;
wherein determining the second service identifier and the second NFV node instance identifier according to the input information comprises: obtaining, by the VN server by querying according to the query condition, the second service identifier and the second NFV node instance identifier that are of the deployed second service and that satisfy the query condition; and
wherein, when multiple NFV node instance identifiers that are of the second service and that satisfy the query condition are obtained by querying, establishing the connection between the first NFV node instance of the first service and the second NFV node instance of the second service comprises:
creating, by the VN server, a corresponding first NFV node instance of the first service for each second NFV node instance identifier that is of the second service and that is obtained by querying, and establishing a connection between each created first NFV node instance of the first service and a respective corresponding second NFV node instance of the second service according to the second service identifier, each second NFV node instance identifier, and the access point information of the second service.

4. The method according to claim 1, wherein the input information comprises the second service identifier and the second NFV node instance identifier.

5. The method according to claim 1, wherein the input information instructs to use an input device to receive the second service identifier and the second NFV node instance identifier that are input by a user using the input device.

6. A virtualized network server, comprising:
a non-transitory memory comprising a plurality of computer readable instructions stored thereon; and
a processor coupled to memory, wherein the plurality of the computer readable instructions cause the processor to be configured to:
receive a service deployment request from a service provider device, wherein the service deployment request comprises a first service description of a to-be-deployed first service, the first service description comprises first Network Functions Virtualization (NFV) node information, first connection information, and information about access to a deployed second service, wherein the information about access to the deployed second service comprises input information and access point information of the second service for the first service to use to access the second service, and wherein the access point information of the second service comprises an access point identifier used during access of the second service, a protocol type used during access of the second service, and a port number used during access of the second service;
create multiple NFV node instances according to the first NFV node information, and establish a connection used for data interaction between the multiple NFV node instances of the first service according to the first connection information;
determine a second service identifier and a second NFV node instance identifier according to the input information; and
establish a connection used for data interaction between a first NFV node instance of the first service and a second NFV node instance of the second service according to the second service identifier, the second NFV node instance identifier, and the access point information of the second service, wherein the first NFV node instance and the second NFV node instance are node instances of the multiple NFV node instances.

7. The virtualized network server according to claim 6, wherein the input information comprises a query condition;
wherein the plurality of computer readable instructions further cause the processor to be configured to:
obtain, by querying according to the query condition, the second service identifier and the second NFV node instance identifier that are of the deployed second service and that satisfy the query condition; and
when multiple NFV node instance identifiers that are of the second service and that satisfy the query condition are obtained by querying, return the obtained multiple NFV node instance identifiers of the second service to a service provider device, and receive a second NFV node instance identifier that is of the second service and that is selected by the service provider device.

8. The virtualized network server according to claim 6, wherein the input information comprises a query condition;
wherein the plurality of computer readable instructions further cause the processor to be configured to:
obtain, by querying according to the query condition, the second service identifier and the second NFV node instance identifier that are of the deployed second service and that satisfy the query condition; and
when multiple NFV node instance identifiers that are of the second service and that satisfy the query condition are obtained by querying, create a corresponding first NFV node instance of the first service for each second NFV node instance identifier that is of the second service and that is obtained by querying, and establish a connection between each created first NFV node instance of the first service and a respective corresponding second NFV node instance of the second service according to the second service identifier, each second NFV node instance identifier, and the access point information of the second service.

9. The virtualized network server according to claim 6, wherein the input information comprises the second service identifier and the second NFV node instance identifier.

10. The virtualized network server according to claim 6, wherein the input information instructs to use an input device to receive the second service identifier and the second NFV node instance identifier that are input by a user using the input device.

11. A communication system, comprising:
a service provider device; and
a virtual network server;
wherein the service provider device is configured to:
send a service deployment request to the virtual network server, wherein the service deployment request comprises first service description of a to-be-deployed first service, the first service description comprises first Network Functions Virtualization (NFV) node information, first connection information, and information about access to a deployed second service, wherein the information about access to the deployed second service comprises input information and access point information of the second service for the first service to use to access the second service, and wherein the access point information of the second service comprises an access point identifier used during access of the second service, a protocol type used during access of the second service, and a port number used during access of the second service; and
wherein the virtual network server is configured to:
receive the service deployment request from the service provider device;
create multiple NFV node instances according to the first NFV node information;
establish a connection used for data interaction between the multiple NFV node instances of the first service according to the first connection information;
determine a second service identifier and a second NFV instance identifier according to the input information; and
establish a connection used for data interaction between a first NFV node instance of the first service and a second NFV node instance of the second service according to the second service identifier, the second NFV instance identifier, and the access point information of the second service, wherein the first NFV node instance and the second NFV node instance are node instances of the multiple NFV node instances.

12. The communication system according to claim 11, wherein the input information comprises a query condition;
wherein determining the second service identifier and the second NFV instance identifier according to the input information comprises:
obtaining, by querying according to the query condition, the second service identifier and the second NFV instance identifier that are of the deployed second service and that satisfy the query condition; and
wherein, when multiple NFV instance identifiers that are of the second service and that satisfy the query condition are obtained, the virtual network server is configured to:
return the obtained multiple NFV instance identifiers of the second service to the service provider device, and receive the second NFV instance identifier that is of the second service and that is selected by the service provider device.

13. The communication system according to claim 11, wherein the input information comprises a query condition;
wherein determining the second service identifier and the second NFV instance identifier according to the input information comprises: obtaining, by querying according to the query condition, the second service identifier and the second NFV instance identifier that are of the deployed second service and that satisfy the query condition; and
wherein, when multiple NFV instance identifiers that are of the second service and that satisfy the query condition are obtained by querying, establishing the connection between the first instance of the first service and a second instance of the second service comprises:
creating a corresponding first instance of the first service for each second NFV instance identifier that is of the second service and that is obtained by querying, and establishing a connection between each created first instance of the first service and a respective corresponding second instance of the second service according to the second service identifier, each second NFV instance identifier, and the access point information of the second service.

14. The communication system according to claim 11, wherein the input information comprises the second service identifier and the second NFV instance identifier.

15. The communication system according to claim 11, wherein the input information instructs to use an input device to receive the second service identifier and the second NFV instance identifier that are input by a user using the input device.

* * * * *